United States Patent
Muroki et al.

Patent Number: 5,552,876
Date of Patent: Sep. 3, 1996

[54] APPARATUS AND METHOD FOR FORMING SUPERIMPOSED IMAGES AND COPYING MACHINE EQUIPPED WITH APPARATUS

[75] Inventors: Kenichi Muroki; Shoji Imaizumi, both of Toyokawa, Japan

[73] Assignee: Minolta Camera Kabushiki Kaisha, Osaka, Japan

[21] Appl. No.: 4,594

[22] Filed: Jan. 14, 1993

[30] Foreign Application Priority Data

Jan. 17, 1992 [JP] Japan ..................... 4-006499

[51] Int. Cl.⁶ ..................... G03G 21/00
[52] U.S. Cl. .............. 355/326 R; 347/116; 355/208
[58] Field of Search .................. 346/108, 167 R, 346/1.1; 355/326 R, 327, 228, 328, 208, 218–219; 347/115–116

[56] References Cited

U.S. PATENT DOCUMENTS

| | | | |
|---|---|---|---|
| Re. 32,139 | 5/1986 | Taudt et al. .................. 358/78 |
| 4,792,828 | 12/1988 | Ozawa et al. ................. 35/55 X |
| 4,819,025 | 4/1989 | Takahashi et al. ............. 355/326 X |
| 4,829,326 | 5/1989 | Emmett et al. ................ 346/157 |
| 4,862,512 | 8/1989 | Hidaka et al. ................ 382/58 |
| 5,021,832 | 6/1991 | Fukushima ................... 355/218 |
| 5,087,928 | 2/1992 | Okino ....................... 358/296 X |
| 5,093,674 | 3/1992 | Storlie ...................... 355/272 X |
| 5,136,372 | 8/1992 | Nakatani et al. .............. 358/80 |
| 5,229,787 | 7/1993 | Reis et al. .................. 346/107 R |

*Primary Examiner*—A. T. Grimley
*Assistant Examiner*—Thu Dang
*Attorney, Agent, or Firm*—Willian Brinks Hofer Gilson & Lione

[57] ABSTRACT

Disclosed is an image processing apparatus by which a first image corresponding to first image information and a second image corresponding to second image information are superimposed one on the top of the other, the apparatus comprising a scanning device for scanning a document line by line to output the first image information; a composing device for composing the first and second image information so that the first and second images are superimposed one on the top of the other; a detecting device for detecting changes of the scanning speed in a direction perpendicular to the lines; and a controlling device for so controlling the composing device that the relative position of the second and first images in the direction are adjusted line by line in accordance with the results detected.

33 Claims, 16 Drawing Sheets

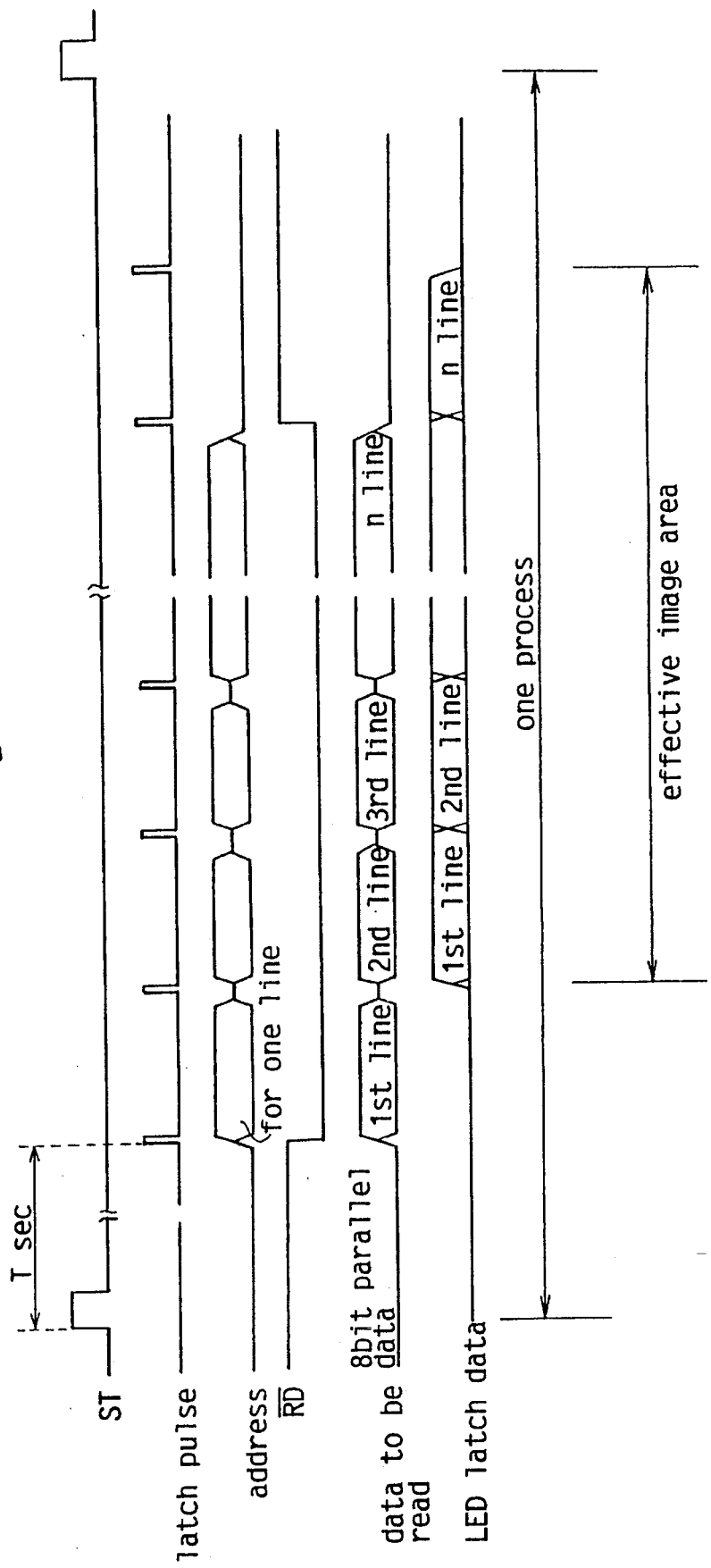

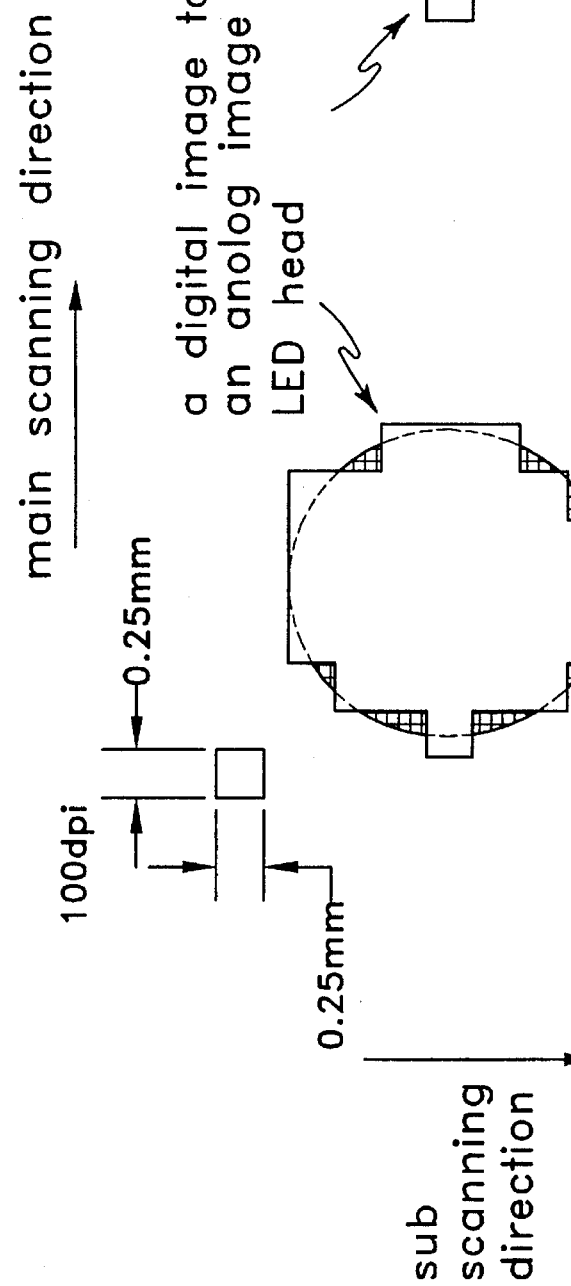
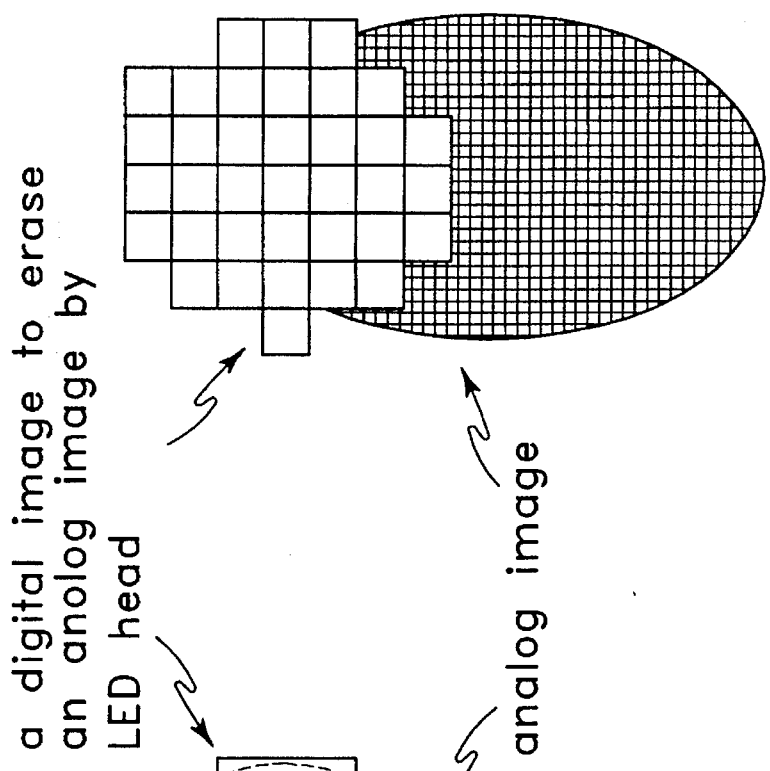
Fig. 8(a)
Fig. 8(b)

APPARATUS AND METHOD FOR FORMING SUPERIMPOSED IMAGES AND COPYING MACHINE EQUIPPED WITH APPARATUS

BACKGROUND OF THE INVENTION (1) Field of the Invention

This invention relates to an apparatus and method for image processing by which two images are superimposed one on the top of the other, and to an image forming apparatus, such as a copying machine, equipped with such an apparatus for image processing.

(2) Description of the Related Art

Various apparatuses for superimposing two images one on the top of the other have been known, one of which is a digital-erasing apparatus, used in color copying machines and the like to erase analog images. According to this apparatus, a document (an analog image) is reflected onto the surface of a photoconductor through an optical system consisting of an exposure lamp, mirrors, and a lens in order to form an electrostatic latent image. The undesired area of the document is erased by use of a light emitting diode (hereinafter referred to as LED) head.

The above-mentioned digital-erasing apparatus, which supplies black toner to black electrostatic latent images formed on the photoconductive drum, is suitably used to obtain preferable black images because black made by composing yellow, magenta, and cyanine, is not natural black. The LED head successively erases an area of each electrostatic latent image of yellow, magenta, and cyanine, the area turning out to be black when these three color images are superimposed altogether. Lighting signals corresponding to the black area detected on a document read by an image sensor, or a CCD are supplied line by line to the LED head synchronously with latch pulses controlling the supply of the light signals. Generally, such latch pulses have a certain cycle period; however, the torque fluctuation or the like during the scanning of the optical system may cause a scanner motor used to form analog images to be driven at an irregular speed. This brings about a problem that an analog image and a digital image formed based on digital data so as to erase part of the analog image may not coincide both in position and size.

If the scanning speed is two-thirds as low as the regulation speed, an analog image Ib shown in FIG. 16 (b) is formed which is 1.5 as long in the sub scanning direction as the expected black image Ia shown in FIG. 16 (a). This is because the scanning speed is low while the rotating speed of the photoconductor is regulated. As shown in FIG. 16 (c), a digital image Ic corresponds in shape to the analog image Ia because the cycle period of the latch pulses is regulated. When both images Ic and Ib are superimposed one on the top of the other on the photoconductor in order to erase the analog image Ib, they appear as shown in FIG. 16 (d). Thus, the irregular scanning speed makes magnification of an analog image and a digital image disaccord in the sub scanning direction. Furthermore, in most cases, even the record starting points of the images Ib and Ic do not coincide, which prevent the analog image from being preferably erased.

SUMMARY OF THE INVENTION

The object of this invention is to provide an apparatus and method for image processing and an image forming apparatus such as a copying machine, equipped with the apparatus for image processing by which an image on a document to be scanned and another image to modify it can be superimposed one on the top of the other without any disaccord in position or magnification.

The above object can be achieved by constructing these apparatuses so that the relative positions of both images are adjusted according to the scanning speed or position of a document, or the variation of the scanning speed.

According to the above construction, since the relative positions can be varied depending on the scanning speed at every moment, disaccord in position or magnification can be prevented. Especially when such a construction is applied in a color copying machine in which an analog image and a digital image are superimposed one on the top of the other, the analog image can be erased without fail, thereby realizing clear copying with good quality.

The scanning speed or position of a document, and the variation of the scanning speed are easily detected from the interval or timing of pulses outputted from an rotary encoder, or the like.

Images thus superimposed may be analog images formed by optical projection, or digital images based on digital data inputted by an image sensor or the like.

Such a superimposition of images may be carried out on an image carrier such as an photoconductive drum or on memory.

The above-mentioned positional adjustment of both images may be carried out by controlling the timing for image generation in such a case that the image processing is applied in an image forming apparatus by which images are formed by the relative displacement between an image carrier and an image generation source.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 7 is a timing chart explaining the lighting operation of the LED head.

FIGS. 8(a) and 8(b) are illustrations explaining problems in a case that the latch pulses have a definite cycle period in the copying machine.

DESCRIPTION OF THE PREFERRED EMBODIMENT

[The overall construction of the copying machine]

Figure 1:
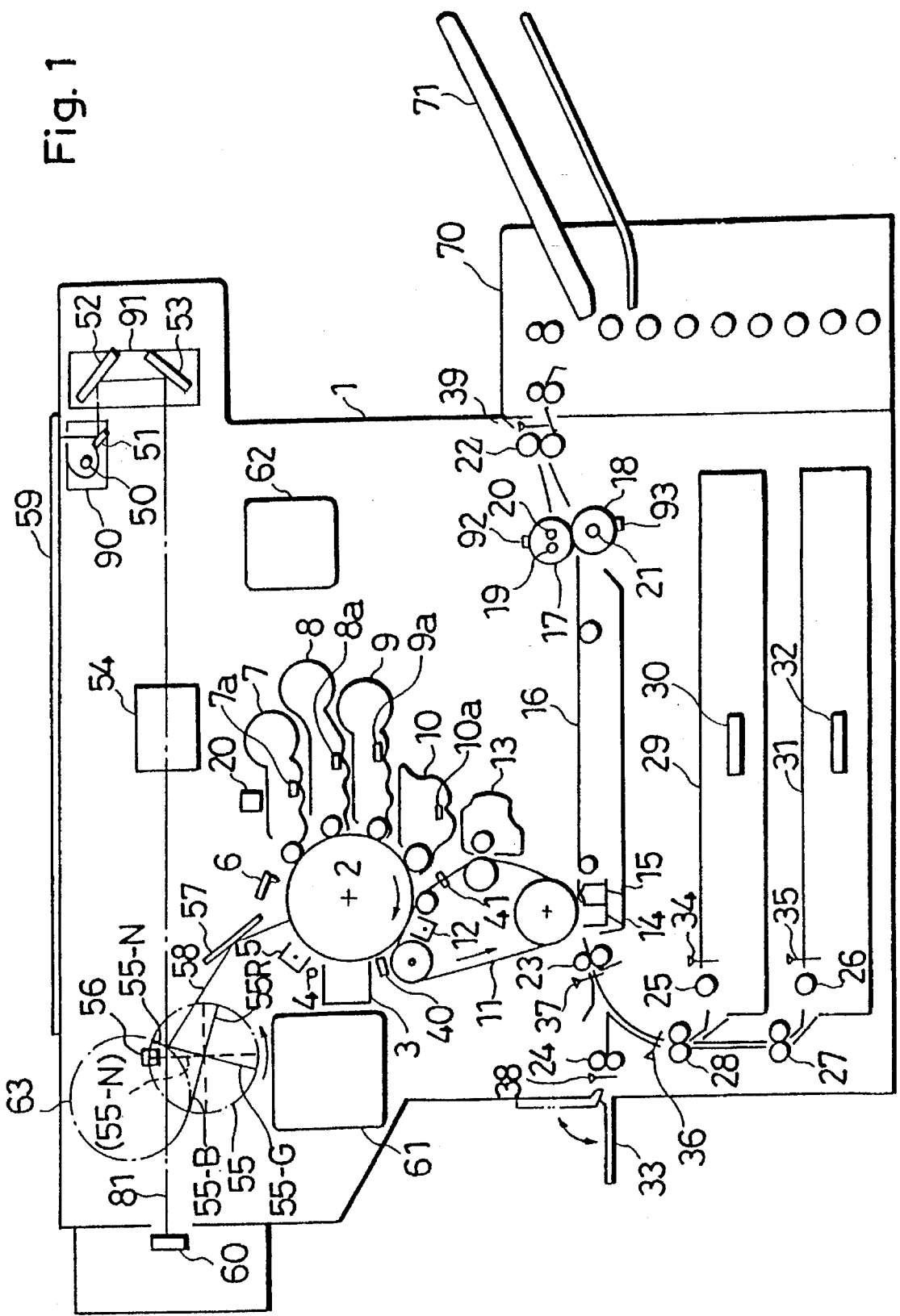
FIG. 1 shows the construction of a copying machine of an embodiment of this invention.

As shown in FIG. 1, the copying machine 1 of this invention comprises a clockwise rotatable photoconductive drum 2 disposed about the center thereof, a cleaning unit 3, a main eraser lamp 4, a charger 5, an LED head 6, development units 7–10, an AIDC sensor 40, and an intermediate transfer medium 11 (hereinafter referred to as transfer belt) to transfer a visualized toner image formed on the photosensitive drum 2.

The photoconductive drum 2 has an evenly charged photoconductive layer thereon, onto which images through an optical system are exposed.

The optical system, so disposed that a document can be scanned below an original glass plate 59, consists of an exposure lamp 50, sliding mirrors 51, 52, and 53, a main lens 54, a set of rotatable mirrors 55, and a fixed mirror 57. The rotatable mirrors 55 consist of four mirrors 55-N, 55-B, 55-G, and 55-R respectively having an ND filter, a blue filter, a green filter, a red filter deposited on each surface. The reference number 58 indicates a light path used during the image forming operation.

The copying machine 1 further comprises a phomoploidy-type color-image sensor 60, or a CCD having the same optical path length as the photosensitive drum 2 and a home position sensor 56 detecting the home position of the rotatable mirrors 55, so disposed that the mirror 55-N is positioned perpendicular to a light path 81 used during the image reading operation. Thus, a light reflected from a document is eradiated to the color-image sensor 60 by positioning the mirror 55-N perpendicular to the light path 81.

The set of rotatable mirrors 55 is so adjusted to the light path 58 that each of the mirrors 55-B, 55-G, and 55-R leads a light to the photosensitive drum 2 in order to form images of yellow, magenta, and cyanine respectively. This adjustment is driven by an unillustrated stepping motor and is accurately positioned by a mechanism (not shown in FIG. 1).

The exposure lamp 50 and the slidable mirror 51 compose a first slider 90 while the slidable mirrors 52 and 53 compose a second slider 91. Both sliders 90 and 91 are driven by a scanning motor 63 to slide at a respective speed of v/n and v/2n (v is the peripheral velocity of the photoconductive drum 2 and n is a magnification).

The development units 7–10 disposed closely to the photosensitive drum 2 use toner of yellow, magenta, cyanine, and black respectively, and equipped with a toner density sensor 7-a, 8-a, 9-a, or 10-a respectively. Furthermore, a moisture sensor 80 is disposed above the development unit 7.

Disposed around the transfer belt 11 are a transfer charger 12 to transfer a toner image onto the transfer belt 11, a removable belt-cleaning brush 13, a transfer charger 14 to transfer a toner image onto paper, a paper separation charger 15, and a mark sensor 41 which detects a mark (not shown) on the transfer belt 11 to time the multi-transfer thereonto. All these components in the vicinity of the transfer belt 11 as well as the photoconductive drum 2 are driven by a motor 61.

The copying machine 1 further comprises two cassettes 29 and 31, respective paper feed rollers 25 and 26, respective paper size sensors 30 and 32, respective paper shortage sensors 34 and 35, a pair of rollers 27 leading paper from the cassette 31 to the next step, another pair of rollers 28 leading paper from either cassette 29 or 31 to the next step, further another pair of rollers 23 so driven that paper is fed in an appropriate timing for a toner image formed on the transfer belt 11, a paper sensor 36 disposed near the rollers 28, and another paper sensor 37 detecting the top end of the paper to be fed.

A toner image on the transfer belt 11 is transferred onto paper by the transfer charger 14. The paper is separated by the paper separation charger 15, sent to a conveyer unit 16, then to either of a fixing unit 17 or 18 to be made adhere onto the paper, and finally sent out through a pair of paper assist rollers 22. All these systems of paper feeding, conveying, and fusing are driven by a motor 62. Another paper sensor 39 is disposed in the paper assist unit. The fixing unit 17 includes fixing heaters 19 and 20, while the other fixing unit 18 includes an fixing heater 21. These heaters 19, 20, and 21 are selectively controlled to adjust the temperature of the fixing rollers 17 and 18.

Other components of the copying machine 1 are a manual paper feed lid 33, a paper sensor 38 detecting paper fed from a manual paper feed opening, a pair of rollers 24 leading paper to the next step, a sorter 70, and a copy receiving tray 71.

[The construction of the LED head]

Figure 2:
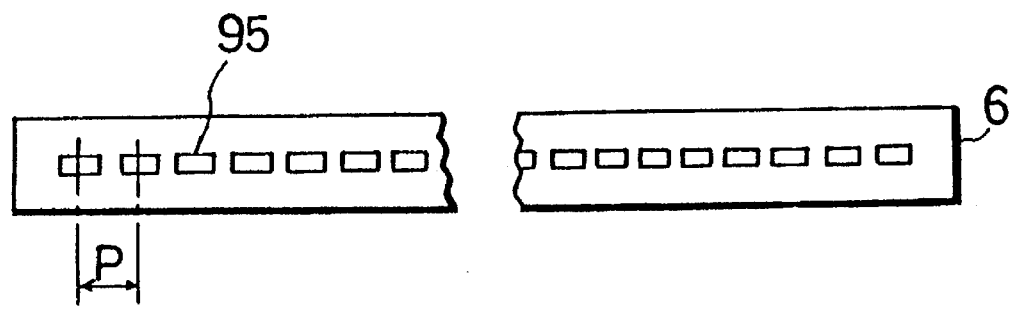
FIG. 2 shows the LED array in the copying machine.

As shown in FIG. 2, the LED head 6 has a number of light emitting diode elements 95 whose light-emitting operation is individually controlled, arrayed opposite to the photoconductor.

Figure 3:
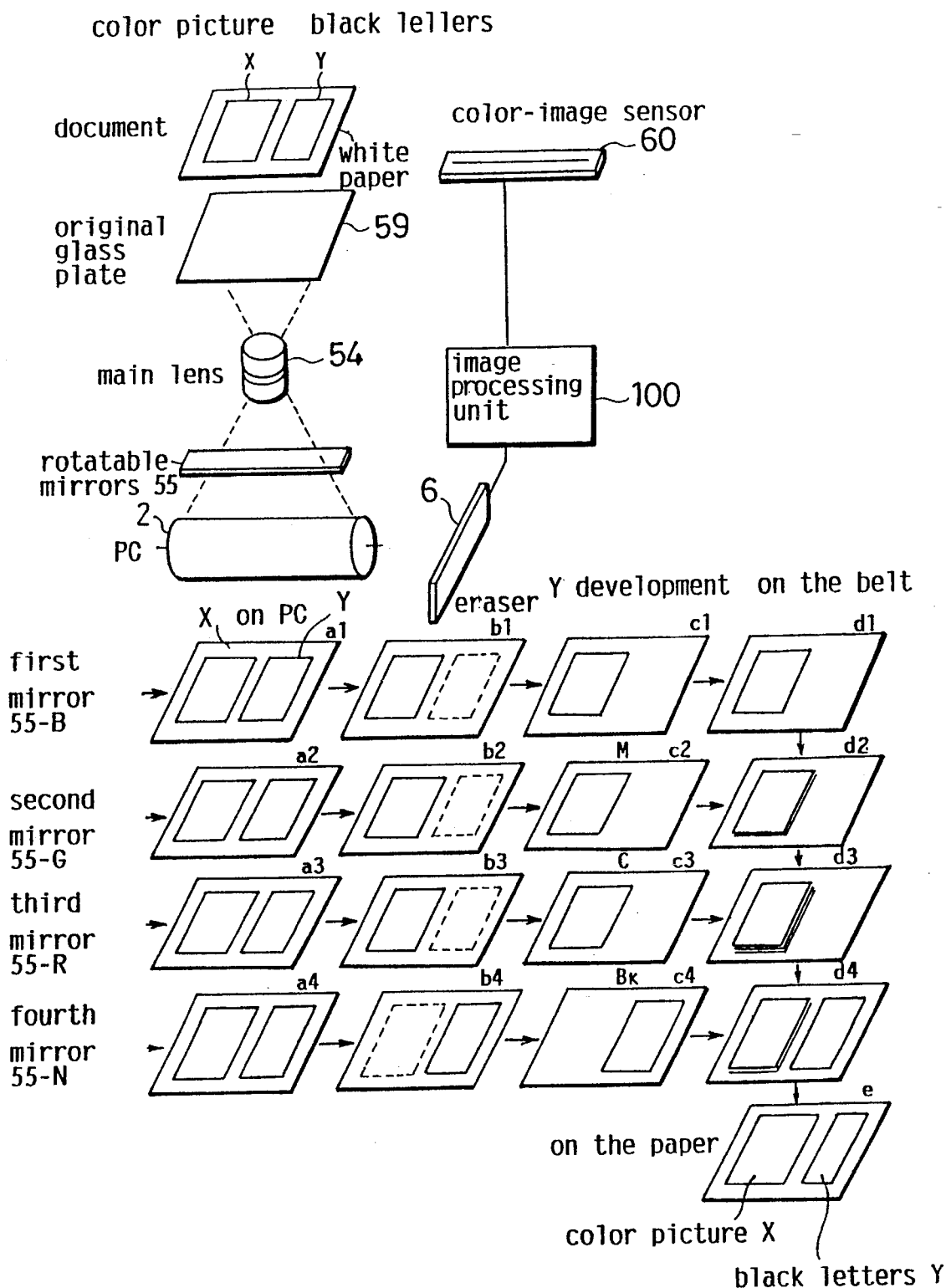
FIG. 3 shows the process of forming a color image of the copying machine.

The process of color-image formation in the copying machine 1 is described hereinafter with reference to FIG. 3.

Prior to the color-image forming process, information on the document is eradiated to the color-image sensor 60 through the main lens 54 and the rotatable mirror 55-N as a result of the scanning by the sliders 90 and 91. The information thus read is processed in an image processing unit 100 so as to be stored in memory. The color-image sensor 60, which is not detailed since it is well known, has red, green, and blue filters deposited on the front surface thereof in order to photolyze the light eradiated from the document into the light components of red, green, and blue. As a result, color information can be judged in a later process: as shown in FIG. 3, a document having a color picture (X) and some black letters (Y) is divided between colored area information and black/white area information to be stored as data to the image processing unit 100. In the image forming process, latent images are scanned to be erased by the LED head 6 according to the information thus read.

In a first image forming process, the mirror 55-B is selected. An electrostatic latent image shown in (a1) corresponding to the amount of the blue light is formed onto the photoconductive drum 2 by the scanning of the optical system. Of the electrostatic latent image thus formed, the area for black letters (Y) is erased as indicated by a dotted line in (b1) with the use of the LED head 6 based on the data in the memory. Since this process is for yellow development, the development unit 7 for yellow is put in movable condition. After this process is completed, as shown in (c1), a certain amount of yellow toner is made adhere to the color picture (X) depending on the amount of the blue light required. After passed the development unit 7, the toner image is transferred onto the transfer belt 11 as shown in (d1).

In a second image forming process, the mirror 55-G is selected. An electrostatic latent image shown in (a2) corresponding to the green light is formed onto the photoconductive drum 2. Of the electrostatic latent image thus formed, the area for black letters (Y) is erased as indicated by a dotted line in (b2) based on the data in the memory. Since this process is for magenta development, the development unit 8 for magenta is put in movable condition. After this process is completed, as shown in (c2), a certain amount of magenta toner is made adhere to the color picture (X) depending on the amount of the green light required. After passed the development unit 8, the toner image is transferred onto the transfer belt 11 and superimposed on the top of the image formed in the first image forming process as shown in (d2).

In a third image forming process, the mirror 55-R is selected. An electrostatic latent image shown in (a3) corresponding to the red light is formed onto the photoconductive drum 2. Of the electrostatic latent image thus formed, the area for black letters (Y) is erased as indicated by a dotted line in (b3) based on the data in the memory. Since this process is for cyanine development, the development unit 9 for cyanine is put in movable condition. After this process is completed, as shown in (c3), a certain amount of cyanine toner is made adhere to the color picture (X) depending on the amount of the cyanine light required. After passed the development unit 9, the toner image is transferred onto the transfer belt 11 and further superimposed on the top of the images formed in the first and second image forming processes as shown in (d3).

In a fourth image forming process, the mirror 55-N is selected. An electrostatic latent image shown in (a4) corresponding to the reflective light is formed onto the photoconductive drum 2. Since this process is a process for black development, the color picture (X) is erased as indicated by a dotted line in (b4), the development unit 10 for black being put in movable condition. After this process is completed, as shown in (c4), a certain amount of black toner is made adhere to the black letters (Y) depending on the amount of the light required. After passed the development unit 10, the toner image is transferred to the transfer belt 11 and is further superimposed on the top of the images formed in the first, second, and third image forming processes as shown in (d4). The visible toner image thus formed onto the transfer belt 11 is transferred onto paper as shown in (e), fixed, and sent out to the copy receiving tray 71. As described hereinbefore, a color picture is formed with toners of yellow, magenta, and cyanine while black letters with black toner.

Figure 4:
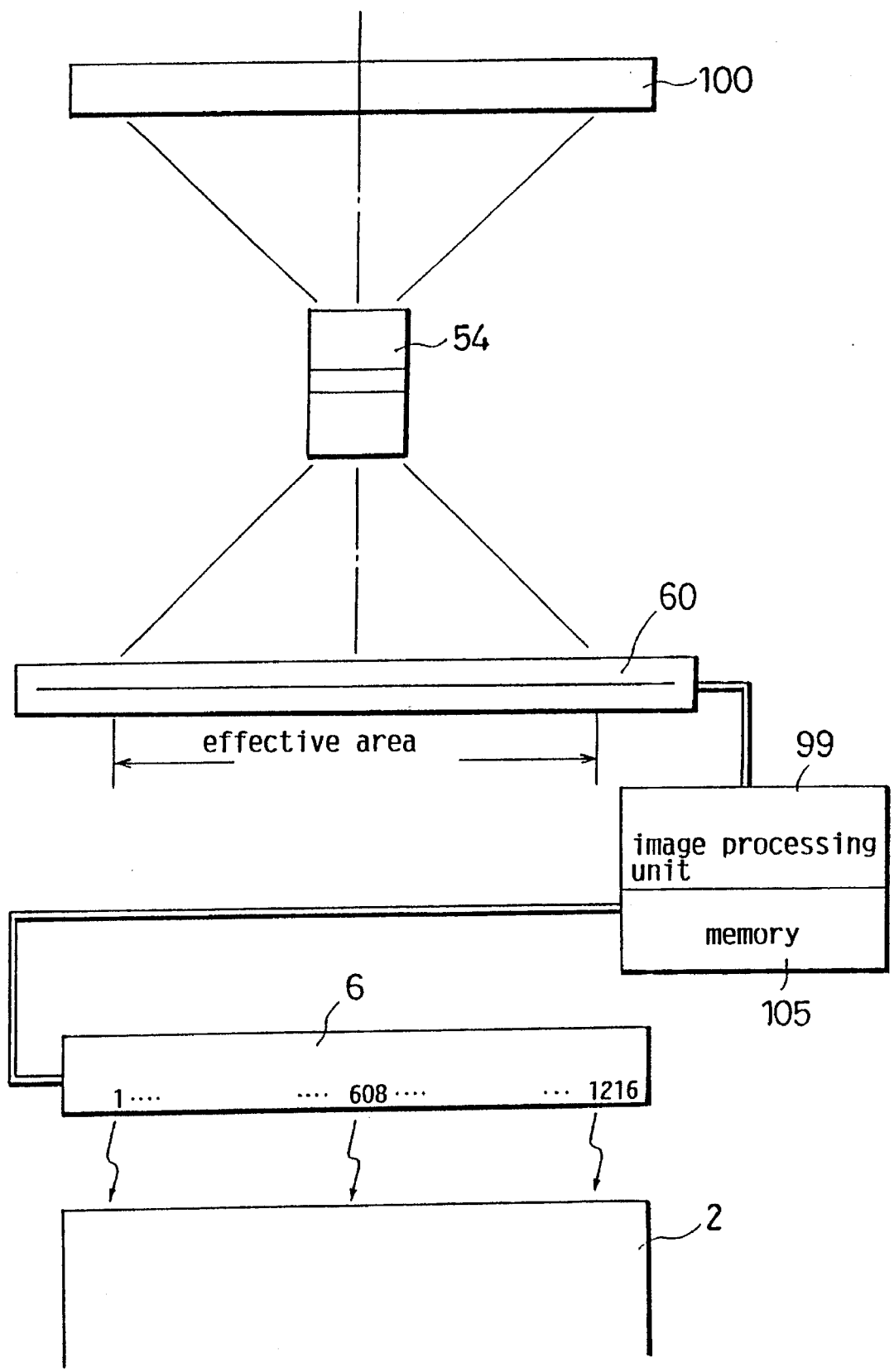
FIG. 4 shows the construction of an image reading unit and a digital image forming unit of the copying machine.

The construction of the image reading unit and the digital image forming unit of the copying machine 1 is described as follows with reference to FIG. 4.

A document scale 100 is disposed on the home position of the first slider 90. The document scale 100 has a center mark 101 thereon to indicate the center of the optical system. The center mark 101 is on the extended line of the optical axis of the main lens 54 through which the color image sensor 60 reads the mark 101. In an image processing unit 99, the mark 101 thus read is detected at the start point of the pre-scanning so that an effective area in each line is determined and data in the effective area is exclusively sent to memory 105. The magnifying process is also carried out in this unit. Image data in the memory 105 is read out for image formation, the photosensitive drum 2 being exposed by use of the LED head 6.

Figure 5:
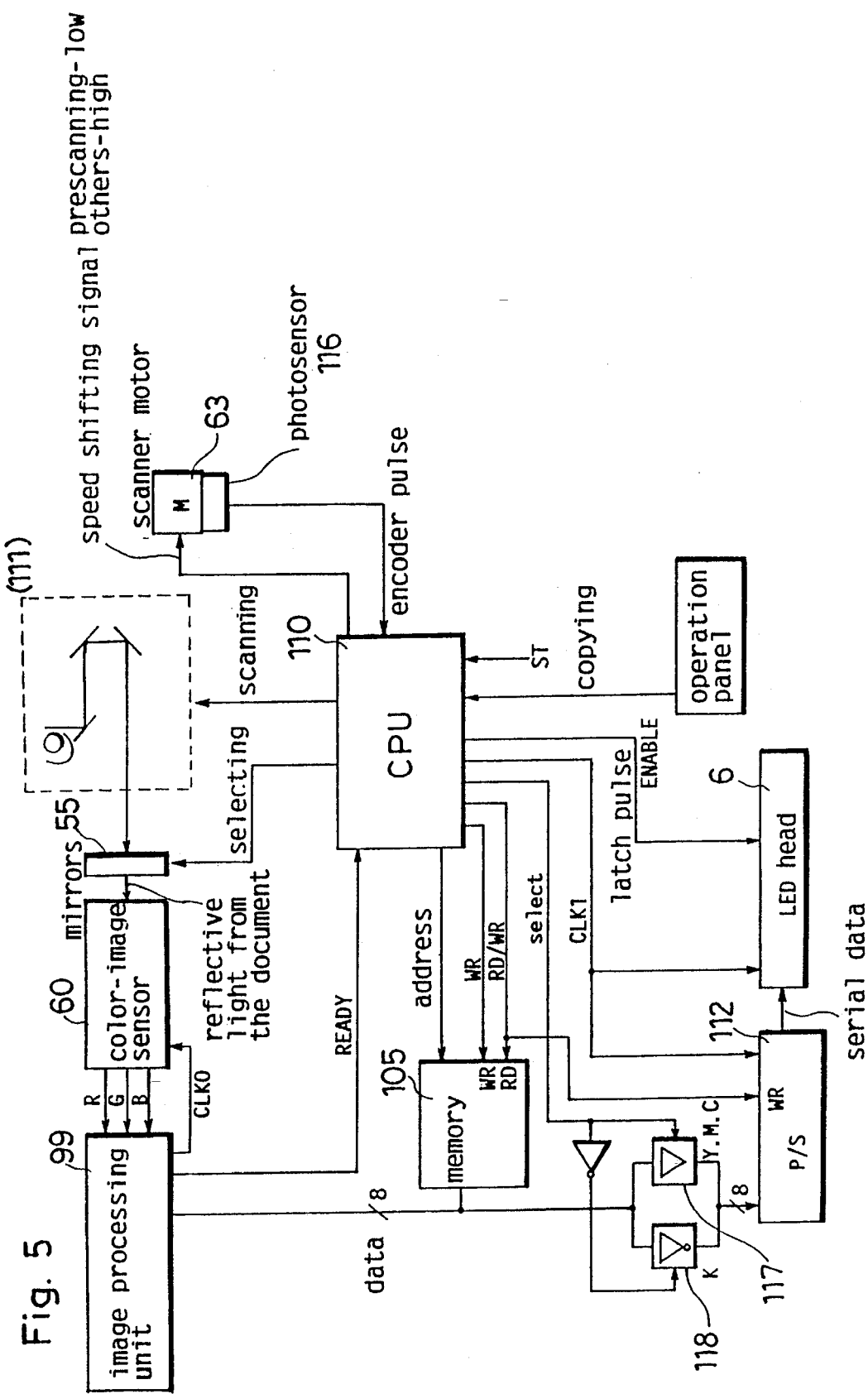
FIG. 5 shows the detailed construction of inputting or outputting the digital image.

The detailed construction of the input/output of digital images is described as follows with reference to FIG. 5. Operated for digital image input are the color-image sensor 60, the image processing unit 99, and the memory 105 while for digital image output are the memory 105, a non-reverse/reverse amplifiers 117 and 118, a parallel/serial converter 112, and the LED head 6. A CPU 110 controls the operations of all these components. The above-mentioned input/output units are constructed the same as conventional ones; however, the CPU 110 receives pulses from an encoder detecting the rotation of the scanner motor 63, and generates latch pulses to supply to the LED head 6.

Figure 11:
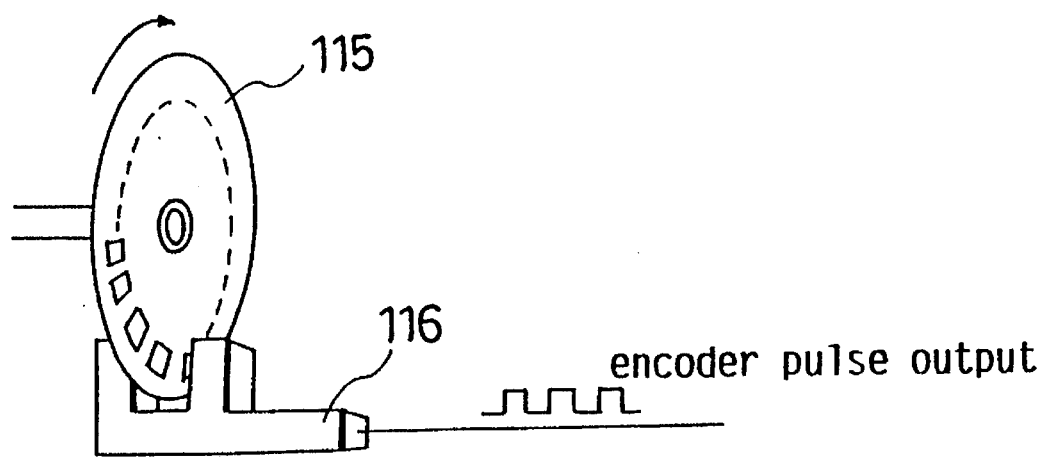
FIG. 11 shows the construction of the encoder of the copying machine.

As shown in FIG. 11, the encoder consists of a disk 115 with a number of slits which is attached to the axis of the scanner motor 63 and a transmission type photosensor 116. The scanner motor 63 makes the disk 115 rotate, by which the slits on the disk 115 cross the detecting position, so that the photosensor 116 outputs encoder pulses. The process of forming the encoder pulses into latch pulses is described later with reference to FIG. 15.

The operations of inputting and reading out image data is described as follows with reference to FIG. 5.

A copying operation is initiated by a direction inputted from an operation panel to the CPU 110. The mirror 55-N of the four mirrors is selected to intercept mainly the infrared rays by a shift signal of the CPU 110, all the color information on a document being inputted to the color-image sensor 60, which outputs unprocessed data of red, green, and blue according to the colors on the document. The color-image sensor 60 reads data for one line on a document all at once, and outputs data for each pixel bit by bit to the image processing unit 99 synchronously with its clock signal CLKφ. The image processing unit 99, when the data is inputted, calculates whether a pixel is in the color area or the black/letter area from its neighboring pixels and then outputs color data indicating either "0" for black/white area or "1" for color area. The image processing unit 99 outputs a ready signal to the CPU 110 every time the color data reach a certain number of bit (8 bit in this case), and puts 8 bit data onto the data bus at the same time. Receiving a ready signal, the CPU 110 transmits the address indicating an area in which the data to store and a writing signal WR to the memory 105, by which the data transmitted from the image processing unit 99 is written in the memory 105.

After the data for one line is written in the memory by repeating the above-mentioned operation, the CPU 110 outputs a scanning signal in order to read image data for the next line so that the first slider 90 is moved by one line. Hereafter, the same operation is repeated until the last line so that the entire area for the document is written in the memory 105.

[Reading out of data]

The entire data for the document thus inputted by a pre-scanning to the memory 105 is repeatedly read out in accordance with each image forming process of yellow, magenta, cyanine, or black.

First, in the process for yellow, the first slider 90 starts scanning in response to a scanning start direction from the CPU 110 to form an analog latent image onto the photoconductive drum 2. At the same time, the data in the memory 105 is read out at a predetermined timing.

Then, the CPU 110 sets an address, a RD signal, and a Select signal, which selects between reverse or non-reverse of data. The Select signal indicates "L" to select the amplifier 117 on the non-reverse side in the process for yellow, magenta, or cyanine, and indicates "H" to select the amplifier 118 on the reverse side in the process for black. Consequently, the color area "1" and the letter area "0" in 8 bit data are transferred to the parallel/serial converter 112 as they are or in reverse.

The parallel/serial converter 112 converts 8 bit data transmitted from the memory 105 into 1 bit serial data to transfer it as data for one line to the LED head 6 synchronously with a clock signal CLK1 transmitted from the CPU 110. The LED head 6 receives the color data and one line synchronization signal, or a latch pulse signal outputted from the CPU 110, and the LEDs for the color data "0" emit lights. Repeating this for the entire document erases the letter area, the color area being visualized by yellow toner. The same operation is carried out in the processes for magenta and cyanine. On the other hand, in the process for black, the Select signal indicates "H", and the data from the memory 105 is reversed to erase the color area so that the letter area is visualized by black toner only.

The timing to start reading data from the memory 105 is so adjusted by the CPU 110 that the starting position to write a digital image onto the photoconductive drum 2 by the light-emission of the LED head 6 coincides with the top end of an analog latent image formed onto the photoconductive drum 2. The adjusting timing is determined mainly by the relative positions between exposure of the analog image and the LED head 6 against the photoconductive drum 2.

After the reading began, the data read out is latched to the LED head 6 by latch pulses line by line. Since the latch pulses are formed out of the encoder pulses in proportion to the rotating angle of the scanner motor 63, the digital image is written onto the surface of the photoconductive drum 2 synchronously with the rotating angle. Since the rotating angle corresponds to the scanning length of the document in the sub scanning direction, the digital image is written line by line every time the image on the document is scanned in a certain length. Accordingly, the length of the digital image and the analog image coincide in the sub scanning direction.

Figure 6:
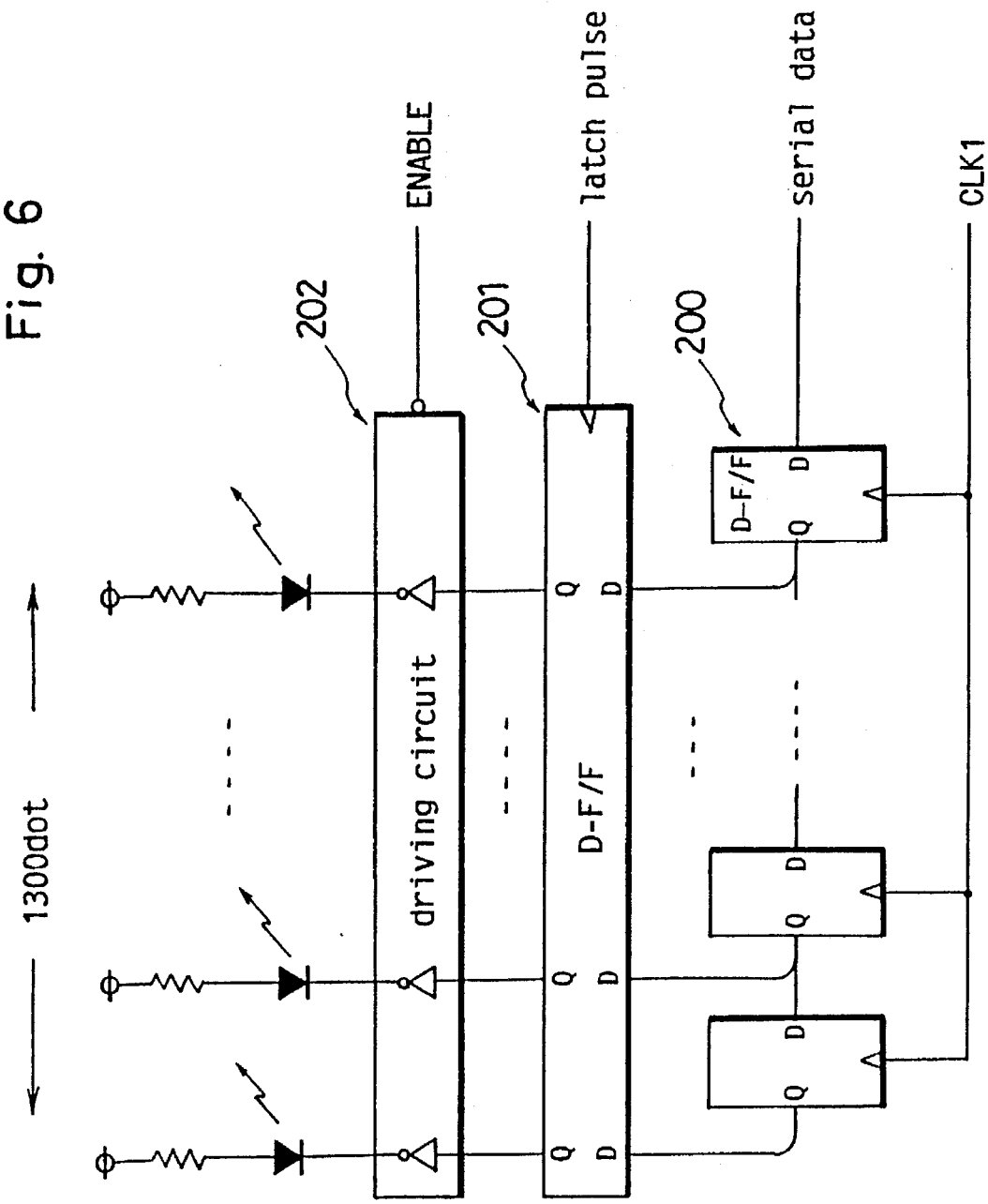
FIG. 6 shows the LED head drive circuit of the copying machine.

The driving circuit of the LED head 6 is described as follows with reference to FIG. 6.

For example, 1300 of D flip-flop 200 are provided to compose a shift register to store serial image data for one line. The serial data are read in the pre-scanning, transmitted from the parallel/serial converter 112, and successively inputted by the clock signal CLK1. Then, when data for one line is inputted, the one-line synchronization signal, a latch pulse is inputted and latched for one line by a D flip flop 201. At this moment, if an ENABLE signal from the CPU 110 indicates "L", the driving circuit allows the LED head 6 to emit lights according to the data for one line (the ENABLE signal is set to "L" in the process for yellow, magenta, cyanine, and black). Thus, data for one line is latched every time a latch pulse is inputted, with the LED head 6 emitting lights. These timing chart is shown in FIG. 7.

Figure 9B:
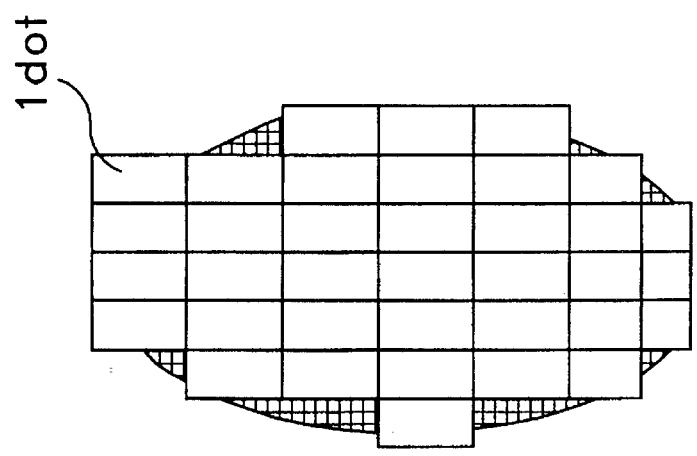
FIGS. 9(a) and 9(b) are illustrations explaining an image composition in a case that the output timing of latch pulses are varied depending on the scanning speed.
Figure 9A:
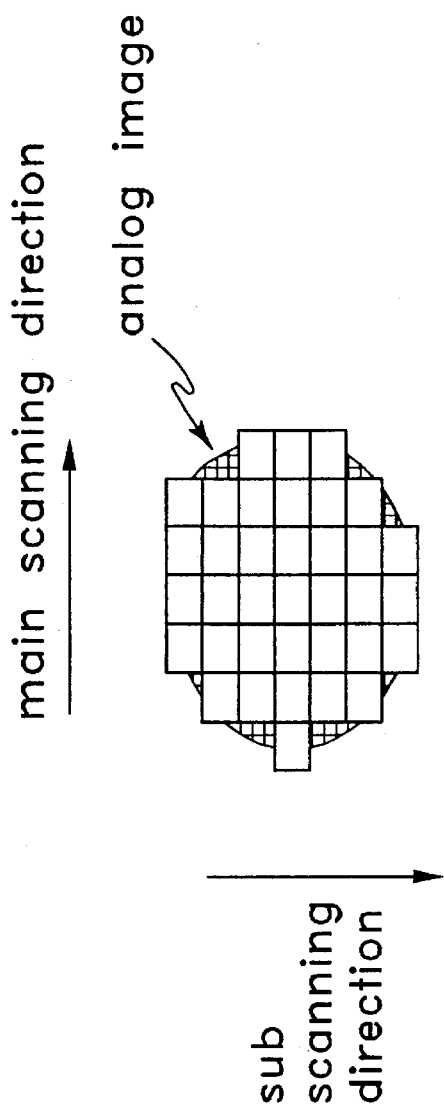

As shown in FIGS. 8(a)–8(b) and 9(a)–9(b), a solid on a document is detected by the color-image sensor 60 at the pre-scanning and erased by use of the LED head 6 in the process of forming an analog image. FIG. 8 (a) is a developed image when the scanning motor 63 works as designed in a conventional apparatus having a regulated latch pulse cycle period, and FIG. 8 (b) is a developed image when the scanning speed is two-thirds lower than designed in the same conventional apparatus. FIGS. 9(a) and 9(b) show images developed by the apparatus of this embodiment when the scanning speed is higher or lower respectively than designed.

In any of these figures, the pixel density and system speed of the LED head 6 are set to 100 dpi and 113 [mm/sec] respectively both in the main and sub scanning. In the conventional apparatus shown in FIGS. 8(a) and 8(b), one cycle period of the latch pulse of the LED head is 0.25 [mm]/113 [mm/sec]=2.2[msec]. Since the first slider 90 is driven at the same speed of 113 [mm/sec] as the system speed, if the amount of one step movement of the scanning motor (stepping motor) 63 is about 62 [μm], the time period of the encoder pulses is found to be 0.062/113=0.55 [ms]. When an apparatus works under these conditions, an analog image and a digital image coincide both in position and size as shown in FIG. 8 (a). The area remains black in the figure is an analog image which has not been erased because it was not regarded as black.

If the scanning speed in the process of forming an analog image is two-thirds lower than designed in the same conventional apparatus, the analog image is formed 1.5 longer in the sub-scanning direction. However, since the latch pulse interval of the LED head 6 is still 2.2 [ms], that is, the pixel density in the sub-scanning direction remains 100 dpi, the digital image does not coincide in position nor magnification with the analog image 1.5 longer in the sub-scanning direction as shown in FIG. 8 (b).

Figures 10A, 10B:
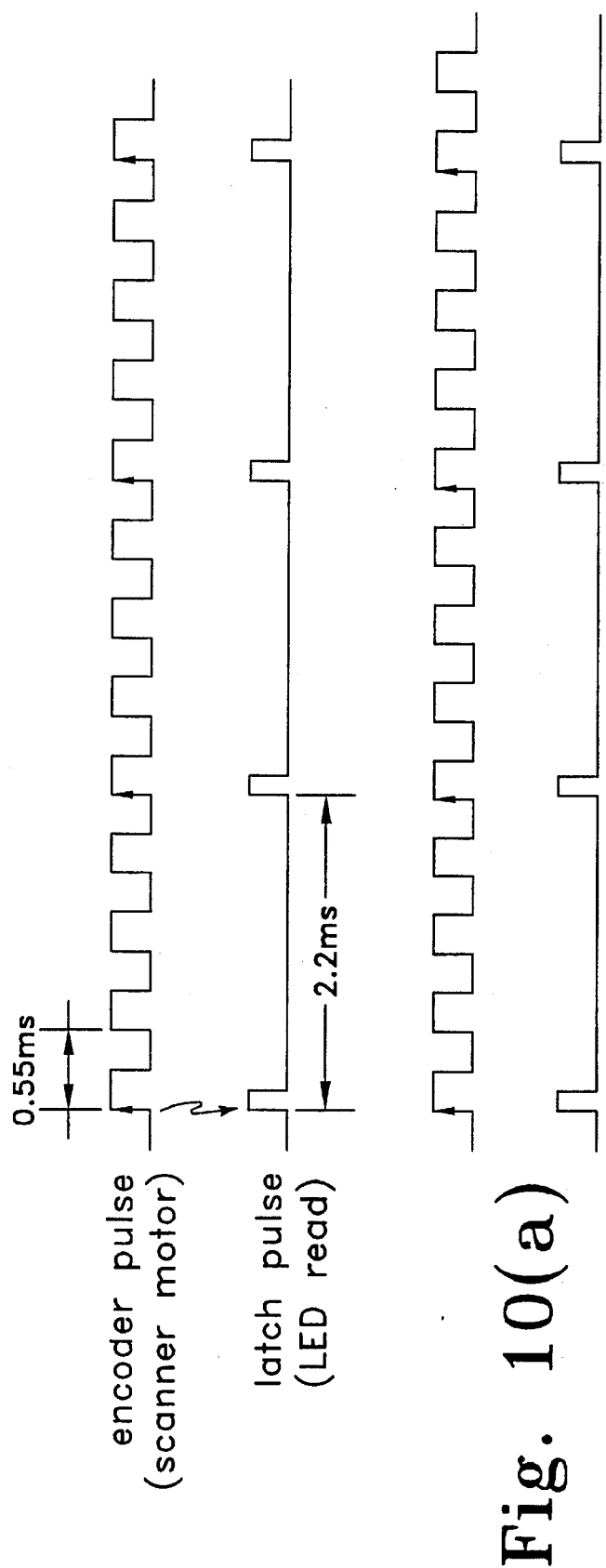
FIGS. 10(a) and 10(b) show a timing chart depicting the relationship between the scanning speed and the latch pulses.

On the other hand, in the apparatus of this embodiment, if the scanning speed is higher than designed, the analog image is formed into a latent image compressed in the sub scanning direction, while a digital image is also written compressed in the sub scanning direction because the latch pulses change its cycle period according to the scanning speed. Therefore, the analog image and the image to be erased coincide both in position and size in the sub-scanning direction as shown in FIG. 9 (a). Since the rotation of the scanning motor 63 and the latch pulses of the LED head 6 synchronize with each other, they coincide as shown in FIG. 8 (b) even the scanning speed varies. The waves of the encoder pulses and the latch pulses of this embodiment shown in FIGS. 10(a) and 10(b) depict that one latch pulse generates per four encoder pulses.

Figure 12:
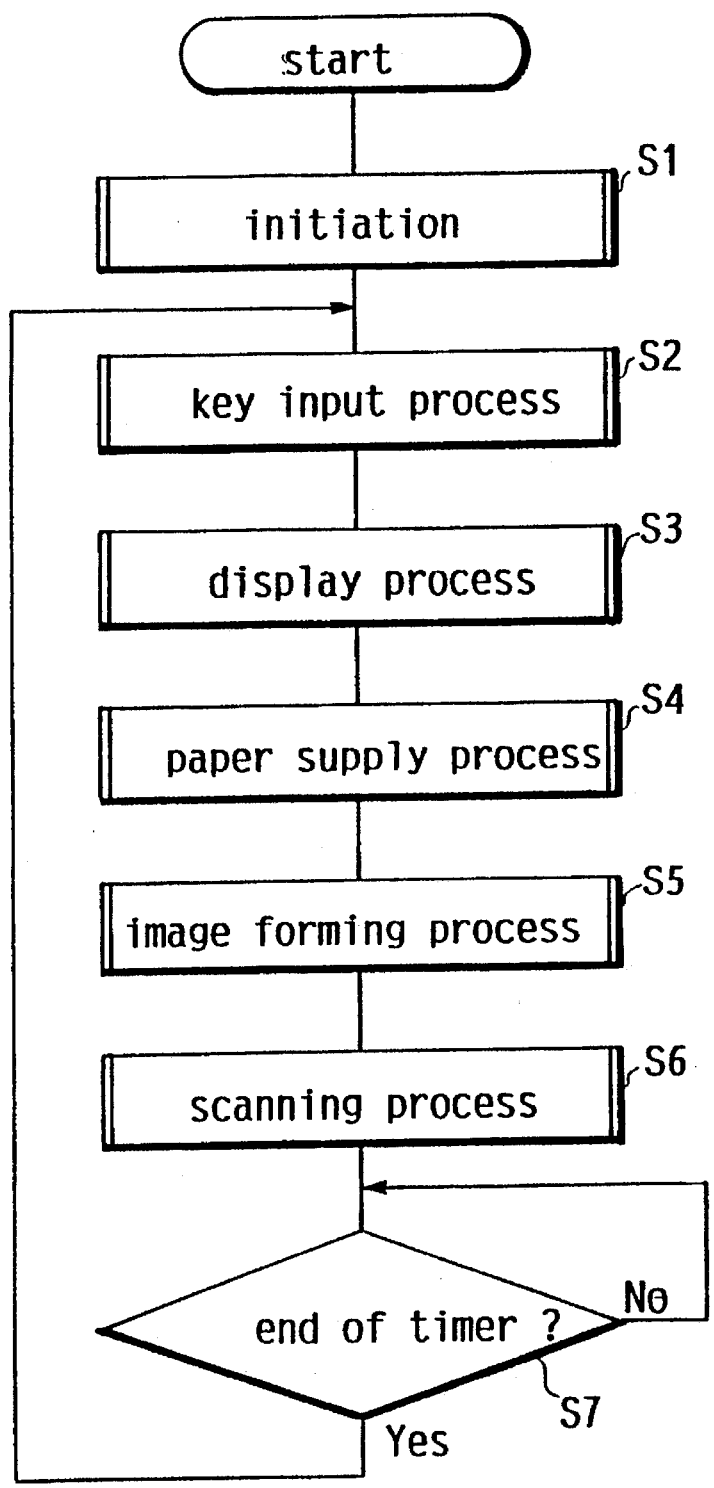
FIG. 12 is a flow chart depicting a main control of the CPU.

The main control flow of the CPU 110 is described as follows with reference to FIG. 12. First, the CPU resister, peripheral I/O device, and the like are initialized (S1). Then, copy mode and the like are set according to the input signal of each switch (S2). The copy mode and the like thus set are displayed (S3). The copying operation is sequentially controlled (S4, S5, and S6). At (S4) the paper feeding procedure is carried out. At (S5) the image forming procedure around the photoconductive drum 2 is carried out. At (S6), the optical scanning procedure is carried out (the scanning speed is set in a low speed at the pre-scanning because the CCD is required both to read images and to process area discrimination). Finally, the end of a timer to regulate the time period between (S2) and (S7) is judged (S7), and goes back to (S2) to resume the operation. Although more complicated control than the flow shown in this embodiment is carried out in the actual copying operation, it is not described here.

Figure 13:
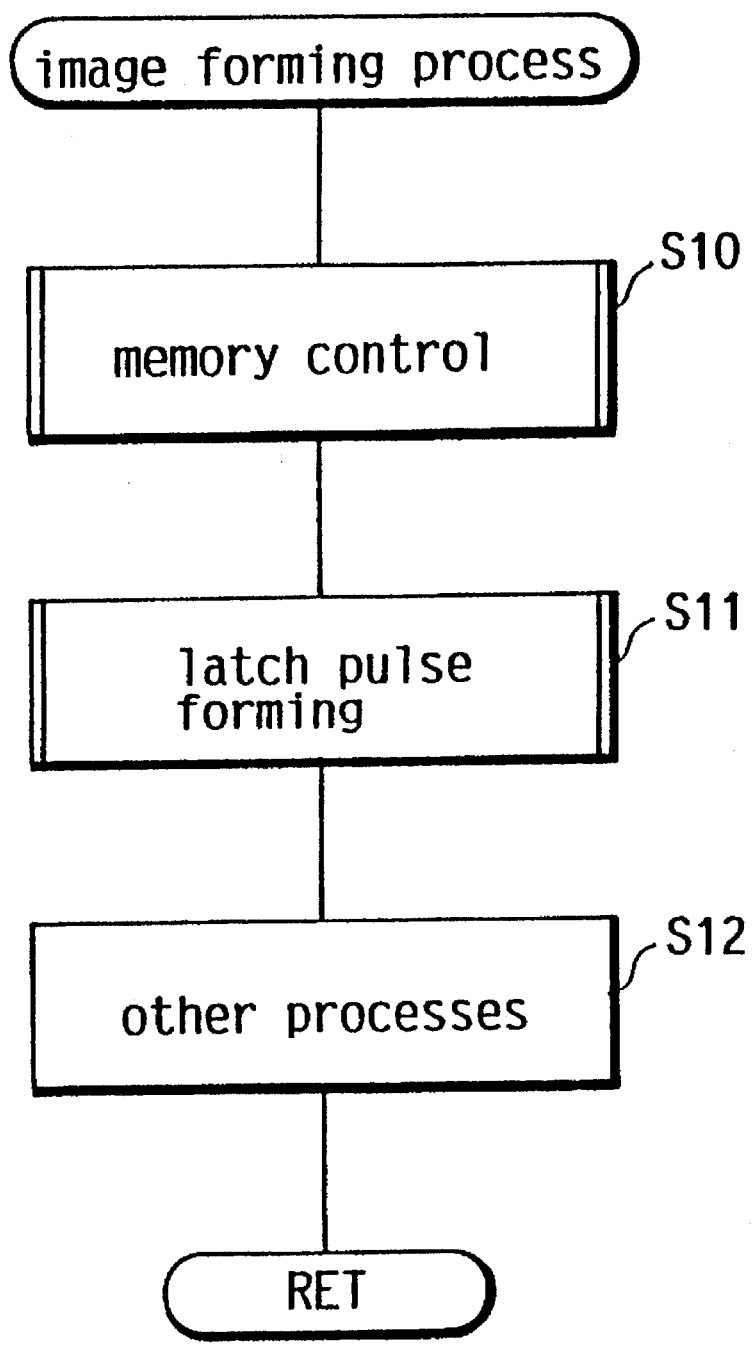
FIG. 13 is a sub-flow chart depicting the image forming process of this invention.

In the sub flow of the image forming process shown in FIG. 13, writing to/reading from the memory 105 is controlled (S10) as described later. Then, latch pulses are formed (S11). Other procedures concerning image formation are carried out (S12), which are not described here.

Figure 14:
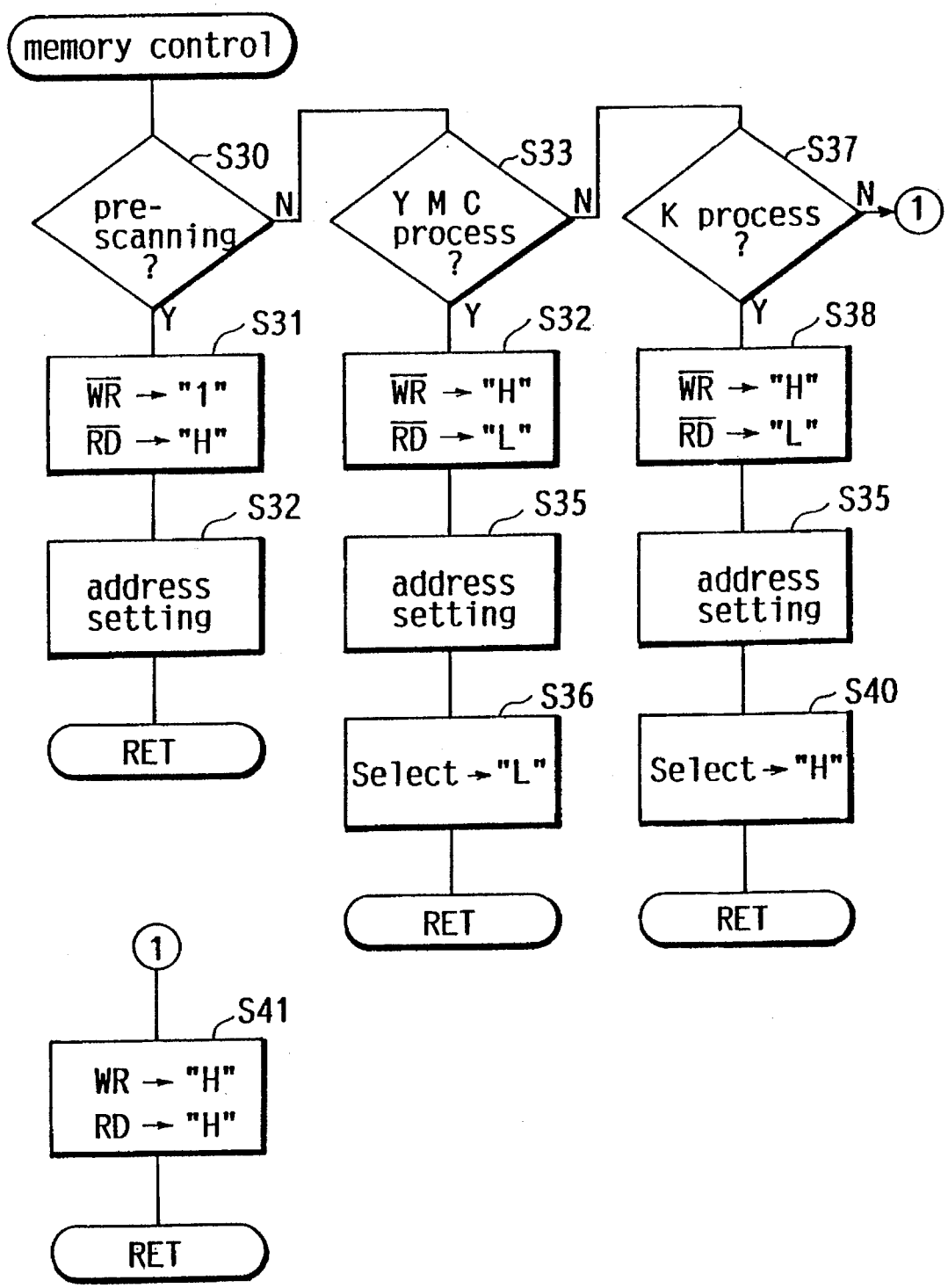
FIG. 14 is a sub-flow chart depicting the memory control.

The control of the writing to/reading from the memory 105 is described as follows with reference to FIG. 14.

First, whether the pre-scanning is in operation or not is judged from a flag set at the scanning process. In case it is, data is written in the memory 105 (S30), the WR signal is set to "L" and the RD signal to "H" (S31), and addresses for one line are sequentially set to write data (S32).

On the other hand, in case the pre-scanning is not in operation, whether either process for yellow, magenta, or cyanine is in operation or not is judged (S33). In case it is: data in the memory 105 is being read, the RD signal is set to "L" (S34), the address of the area to be read is set (S35) at the timing mentioned before, and the Select signal is set to "L" (S36) for selecting between the reverse or non-reverse of data.

In the process for black, data is read and processed in the same manner as in the processes for yellow, magenta, and cyanine (S38 and S39). However, the Select signal is set to "H" and data is reversed (S40). In the case that no process is in operation at (S37), the flow proceeds to (S41) without the memory 105 being accessed. This is the end of this routine.

Figure 15:
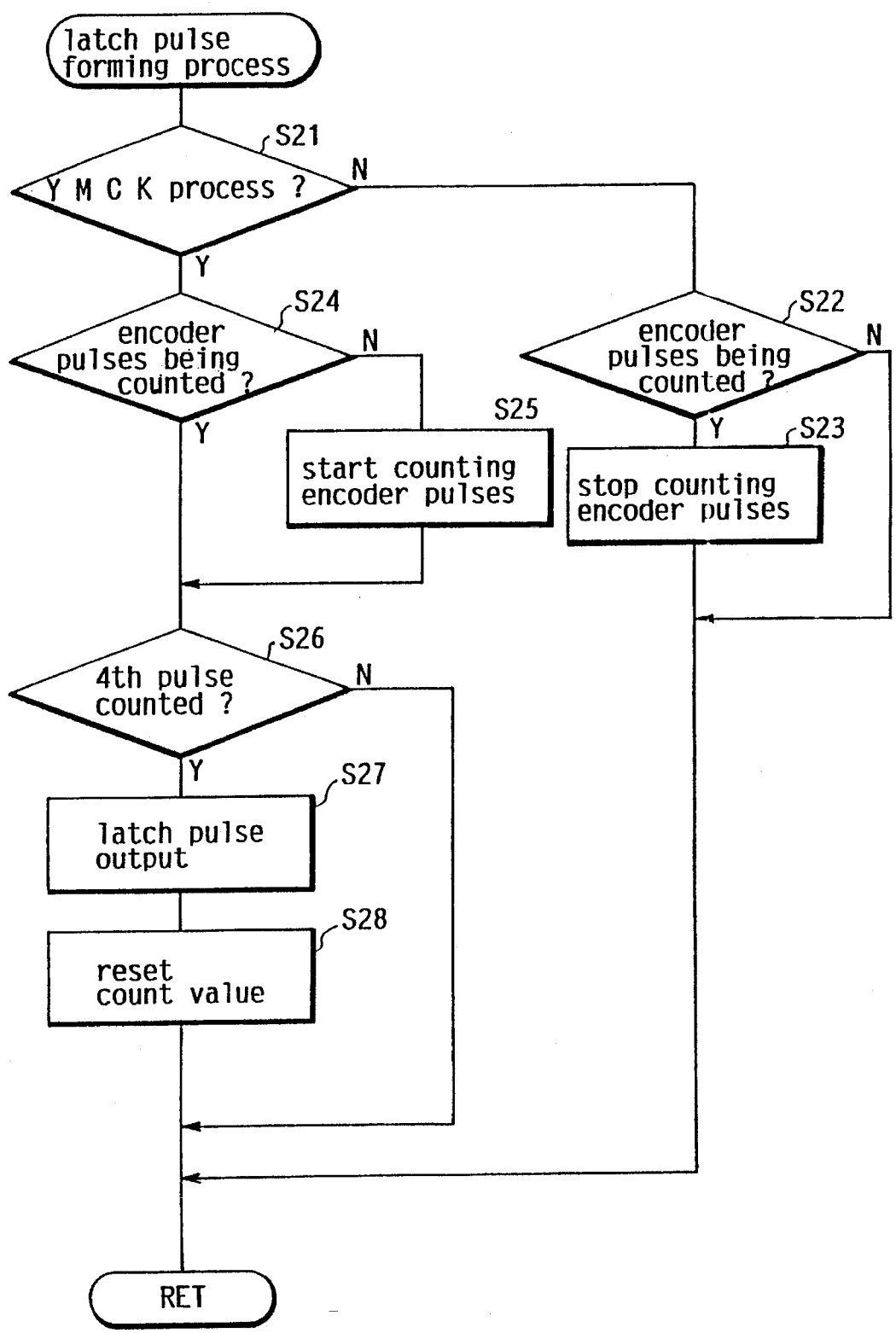
FIG. 15 is a sub-flow chart depicting the latch pulse forming process.
Figure 16A:
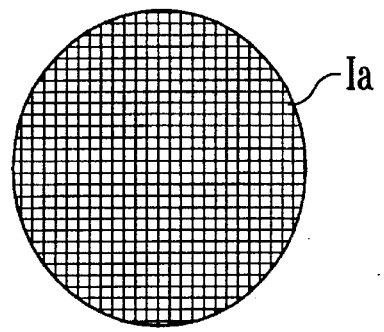
FIGS. 16(a), 16(b), 16(c) and 16(d) show an illustration explaining conventional problems.
Figure 16B:
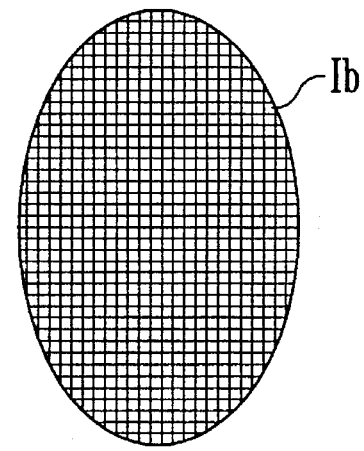
Figure 16C:
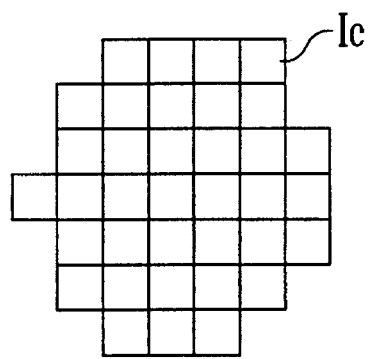
Figure 16D:
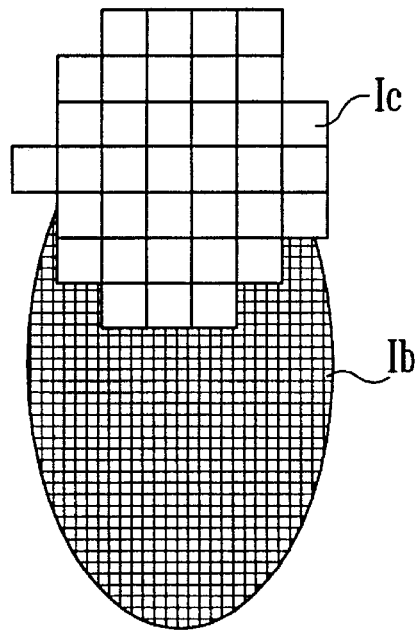

The process of forming latch pulses is described as follows with reference to FIG. 15. First, whether any process for yellow, magenta, cyanine, or black is in operation or not is judged (S21). In case it is, the flow proceeds to (S24), at which whether the encoder pulses outputted from the scanning motor 63 is being counted or not is judged. In case it is not, the counting starts (S25). In case it is, the flow proceeds to (S26), at which whether the fourth pulse was counted or not is judged. If it was, the latch pulse is outputted to the LED head 6 (S27) and resets the count value (S28) to return to the original image processing routine. If it was not, it directly returns to the original image processing routine.

On the other hand, if it is judged that none of yellow, magenta, cyanine, or black process is in operation at (S21), the flow proceeds to (S22) at which whether the encoder pulse is being counted or not is judged, and if it is, the counting is stopped (S23), otherwise the flow directly returns to the original routine.

In the above embodiment, the error of scanning speed is amended at the regular scanning but not at the pre-scanning because the latter is carried out at a lower speed thereby causing less effects of irregular speed. However, it is possible to detect and memorize the generation timing of encoder pulses at the pre-scanning, so as to determine the lighting timing of the LED together with the pulse generation timing at the regular scanning.

Although the above embodiment only shows the case of an analog image and a digital image both composed on the photoconductor, this invention can be applied to the composition of two digital images which are obtained by, for example, reading a document line by line with the use of a photoelectric conversion element array such as a CCD sensor. In this case, both digital images are composed on the memory by writing them into the same memory so that an address in which to write at least one of the images can be controlled according to the scanning speed of the document.

Furthermore, this invention can be applied, besides copying machines, to an apparatus to photolyze a document into each color component, write them to different memories, and read them out to compose, so that each color image is stored according to encoder pulses to be generated at a timing corresponding to each scanning speed in order adjust their positions.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus by which a first image corresponding to first image information and a second image corresponding to second image information are superimposed, said apparatus comprising:

scanning means for scanning a document line by line to output said first image information;

composing means for composing said first image information and said second image information so that said first image and said second image are superimposed;

detecting means for detecting changes of scanning speed in a direction perpendicular to a scanned line; and controlling means for so controlling said composing means that a relative position of said second image and said first image in said direction is adjusted line by line in accordance with the detected changes of scanning speed.

2. The apparatus of claim 1, wherein said composing means comprises:

a moving recording medium;

first-image forming means for forming said first image onto the recording medium in accordance with said first image information; and second-image forming means for forming said second image onto the recording medium in such a manner that said first image and said second image are superimposed in accordance with said second image information.

3. The apparatus of claim 2, wherein said composing means adjusts a timing for forming said second image onto the recording medium under control of said controlling means.

4. The apparatus of claim 2, wherein the recording medium is a photoconductor.

5. The apparatus of claim 1, wherein said composing means comprises a memory and writing means for writing said first image information and said second image information into the memory, and composes the first image information and the second image information in the memory in such a manner that said first image and said second image are superimposed.

6. The apparatus of claim 1, wherein said scanning means comprises a moving unit, which moves relative to the document and a motor to drive the moving unit relative to the document, said detecting means comprising an encoder to generate a pulse signal by means of a rotation of the motor.

7. An image processing apparatus, comprising:

scanning means for scanning a document to output first image information;

storing means for storing second image information;

composing means for composing said first image information and said second image information;

detecting means for detecting a scanning speed of said scanning means; and controlling means for so controlling said composing means that a timing for composing said first image information and said second image information is adjusted according to the scanning speed detected.

8. The apparatus of claim 7, wherein said second image information is obtained during a pre-scanning prior to scanning of the document.

9. The apparatus of claim 7, wherein said second image information represents whether an area of said first image should be erased or not.

10. The apparatus of claim 9, further comprising reversing means for reversing areas to be erased and not to be erased.

11. An image forming apparatus, comprising:

scanning means for scanning a document to generate first image information;

inputting means for inputting second image information, at least one of said first image information and said second image information being digital data;

a photoconductor;

exposing means for exposing the photoconductor in accordance with said first image information and said second image information in order to form an electrostatic latent image;

detecting means for detecting a scanning speed of said scanning means; and controlling means for controlling a timing for exposing the photoconductor based on the digital data according to the scanning speed detected.

12. The apparatus of claim 11, wherein said exposing means exposes the photoconductor line by line; and said controlling means controls said timing line by line.

13. The apparatus of claim 12, wherein said first image information is optical analog information; and said second image information is electric digital data.

14. The apparatus of claim 12, wherein both said first image information and said second image information is electric digital data.

15. An image forming apparatus, comprising:

scanning means for scanning a document line by line so as to output digital data corresponding to the document;

regenerating means for regenerating the document onto a recording medium based on the digital data;

detecting means for detecting a scanning speed of said scanning means throughout scanning of the document by said scanning means; and controlling means for controlling a position of the document on the recording medium line by line according to the scanning speed detected.

16. A copying machine, comprising:

scanning means for scanning a document line by line so as to generate digital data corresponding to the document;

a rotating photoconductor;

exposing means for exposing the photoconductor line by line based on the digital data so as to form electrostatic latent images;

detecting means for detecting a scanning speed of said scanning means; and controlling means for so controlling said exposing means such that a timing for exposure is controlled line by line according to the scanning speed detected.

17. A copying machine, comprising:

scanning means for scanning a document;

first exposing means for projecting the scanned document onto a photoconductor so as to form a first electrostatic latent image;

storing means for storing image information;

second exposing means for exposing the photoconductor based on image information stored by said storing means so that a second electrostatic latent image corresponding thereto is formed, and said first electrostatic latent image and said second electrostatic latent image are superimposed;

detecting means for detecting a scanning speed of said scanning means; and controlling means for controlling a timing for exposure of said second exposing means according to scanning speed detected.

18. A copying machine of claim 17, wherein said image information is obtained during a pre-scanning prior to scanning of the document.

19. A copying machine of claim 18, further comprising color discriminating means for outputting said image information discriminating every area of the document between colored or black/white.

20. A copying machine of claim 17, wherein said image information indicates whether an area of said first electrostatic latent image should be erased or not.

21. A copying machine of claim 20, further comprising reversing means for reversing areas to be erased and not to be erased.

22. A copying machine of claim 17, wherein said second exposing means is light emitting elements.

23. A copying machine of claim 22, further comprising holding means for holding said image information and outputting a signal in accordance with held image information to a corresponding electroluminescent device, wherein said controlling means controls a timing for said holding means to hold said image information.

24. A copying machine of claim 23, further comprising a shift register having a plurality of flip flops whose output terminals are each connected with corresponding said holding means, said image information being given as serial data to the shift register, so that said holding means holds new image information at a timing for exposure of said second exposing means.

25. An image processing method by which a first image corresponding to first image information and a second image corresponding to second image information are superimposed, the method comprising the steps of:

scanning a document line by line to output said first image information;

composing said first image information and said second image information so that said first image and said second image are superimposed;

detecting changes of a scanning speed in a direction perpendicular to a scanned line during the scanning step; and controlling the composing so that a relative position of said second image and said first image in said direction is adjusted line by line in accordance with the detected changes of scanning speed.

26. An image processing method, comprising the steps of:

scanning a document to output first image information;

composing said first image information and second image information, said second image information being stored in storing means;

detecting a scanning speed; and controlling the composing so that a timing for composing is adjusted according to the scanning speed detected.

27. An image processing method employed in a copying machine, comprising the steps of:

scanning a document line by line to generate digital data corresponding to the document;

exposing a rotating photoconductor line by line based on the digital data so as to form an electrostatic latent image;

detecting a scanning speed; and controlling an exposure so that a timing for the exposure is controlled line by line according to the scanning speed detected.

28. An image processing method employed in a copying machine, comprising the steps of:

scanning a document;

projecting the document onto a photoconductor so that a first electrostatic latent image is formed;

storing image information;

exposing the photoconductor based on the image information stored so that a second electrostatic latent image corresponding thereto is formed, and said first electrostatic latent image and said second electrostatic latent image are superimposed;

detecting a scanning speed; and controlling a timing for exposure according to the scanning speed detected.

29. An image forming apparatus, comprising:

a photosensitive member;

scanning means for scanning an original image and forming an electrostatic latent image onto the photosensitive member by projecting light reflected from the original image onto the photosensitive member;

memory means for memorizing digital image information;

image writing means for scanning and exposing the digital image information memorized in the memory means on the photosensitive member line by line so that the digital image information is superimposed on the electrostatic latent image formed by said scanning means; and timing means for generating a start signal which varies corresponding to a scanning speed of said scanning means, said start signal indicating start timing of said image writing means for exposing the digital image information on each line.

30. The apparatus as claimed in claim 29, wherein said image writing means removes the electrostatic latent image formed on the photosensitive member by the scanning means.

31. The apparatus as claimed in claim 29, further comprising a plurality of developing units, and wherein said scanning means scans the original image a plurality of times so as to project the light reflected therefrom for a plurality of colors, and said memory means memorizes a black portion of the original image so as to remove the electrostatic latent image corresponding to the black portion of the original image.

32. An image processing method employed in a copying apparatus for copying a document having an image which includes a predetermined color portion and another color portion, comprising the steps of:

scanning the document line by line and memorizing image information of the predetermined color portion of the document;

forming an electrostatic latent image of said predetermined color portion and said another color portion of the document onto a photosensitive member by scanning the document;

outputting a signal line by line which varies in correspondence with a speed for scanning the document; and removing the electrostatic latent image corresponding to the memorized image information of the predetermined color portion of the document line by line in accordance with said signal.

33. The method as claimed in claim 32, wherein said predetermined color is black.

* * * * *